US005798403A

United States Patent [19]
Yamashita et al.

[11] Patent Number: 5,798,403
[45] Date of Patent: Aug. 25, 1998

[54] THERMOPLASTIC RESIN COMPOSITION HAVING HIGH HEAT RESISTANCE

[75] Inventors: Koichi Yamashita; Hiroshi Kobayashi, both of Settsu; Masahiro Asada, Kobe, all of Japan

[73] Assignee: Kanegafuchi Kagaku Kogyo Kabushiki Kaisha, Osaka, Japan

[21] Appl. No.: 836,050

[22] PCT Filed: Nov. 7, 1995

[86] PCT No.: PCT/JP95/02261

§ 371 Date: May 13, 1997

§ 102(e) Date: May 13, 1997

[87] PCT Pub. No.: WO96/15192

PCT Pub. Date: May 23, 1996

[30] Foreign Application Priority Data

Nov. 16, 1994  [JP]  Japan .................. 6-308301

[51] Int. Cl.$^6$ .................................................. C08K 3/34
[52] U.S. Cl. ............................... 524/447; 525/66
[58] Field of Search ............................ 524/447; 525/66

[56] References Cited

U.S. PATENT DOCUMENTS

| | | | |
|---|---|---|---|
| 4,098,734 | 7/1978 | Lee | 524/448 |
| 4,584,344 | 4/1986 | Baer | 524/504 |
| 4,981,906 | 1/1991 | Tomono | 525/66 |
| 4,985,486 | 1/1991 | Westeppe | 524/447 |
| 4,994,508 | 2/1991 | Shiraki | 524/504 |
| 5,202,379 | 4/1993 | Aoki | 525/66 |

*Primary Examiner*—Paul R. Michl
*Attorney, Agent, or Firm*—Armstrong, Westerman, Hattori, McLeland & Naughton

[57] ABSTRACT

This invention provides a heat resistant thermoplastic resin composition comprising (A) 5 to 95 parts by weight of a polyamide resin, (B) 5 to 95 parts by weight of a copolymer containing an unsaturated carboxylic acid, comprising 40 to 80% by weight of an aromatic vinyl compound, 15 to 50% by weight of a vinyl cyanide compound, 0.1 to 20% by weight of an unsaturated carboxylic acid and 0 to 30% by weight of other vinyl compounds copolymerizable therewith, (C) 5 to 50 parts by weight of a graft copolymer, which is obtained by a graft polymerizing 60 to 5% by weight of a vinyl compound in the presence of 40 to 95% by weight of a diene rubber of an average particle size of 0.1 to 2.0 μm, and, (D) 0.1 to 30 parts by weight of a kaolin to 100 parts by weight of the sum (A), (B) and (C). This heat resistant thermoplastic resin composition can provide molded articles which are superior in heat distortion resistance, impact strength and surface appearance, and has a high flowability in its molding.

6 Claims, No Drawings

1

THERMOPLASTIC RESIN COMPOSITION HAVING HIGH HEAT RESISTANCE

FIELD OF THE INVENTION

The present invention relates to a novel heat resistant thermoplastic resin composition, giving a shaped article, which is superior in heat distortion resistance, impact strength and surface appearance, and, which is also superior in flowability in its molding process.

BACKGROUND OF THE INVENTION

Since polyamide resins are superior in heat distortion resistance, rigidity, resistance against chemicals, etc., they are widely used as electrical and automotive parts and other applications. However, it is still desired that they are improved further in impact resistance and water proofing property. On the other hand, since ABS resins, which are representative rubber reinforced resins, are superior in impact strength and flowability at molding, they are also used for such applications as automotive parts, electrical applications or other miscellaneous goods. However, it is also desired that it is improved further in its anti-chemical property, heat distortion resistance, rigidity, etc..

It has been tried to blend a polyamide resin and an ABS resin in order to make the best use of properties of both resins, but a combination of these polymers has a very poor compatibility by nature. Therefore, a molded article made of a blended composition of these two resins is resulted to be unacceptable for a practical use because of poor surface appearance, layer-like peeling, low impact strength, etc., since a dispersion of two resins becomes non-uniform.

Under these circumstances, it has been tried to improve the compatibility between the polyamide resin and the ABS resin by adding a compatibilizer or by modifying the ABS resin itself. For example, a method, where an amine-end group(s) of the polyamide resin is reacted with a graft-copolymer which has been obtained by grafting a monomer containing an unsaturated carboxylic acid on a rubber, is disclosed in unexamined Japanese patent (TOKUKAISHOU 47-6284(1972)), and the other method which introduces a styrene-maleic anhydride as a compatibilizer is disclosed in unexamined Japanese patent (TOKUKAISHOU 56-50931 (1981). And, further, Japanese unexamined patents (TOKUKAI-SHOU 63-179957 (1988). TOKUKAISHOU 63-182369(1988)) disclose a method that polyamide resins are blended with modified styrene resins, which are obtained by grafting styrene, acrylonitrile and an unsaturated carboxylic acid on a rubber and, more, Japanese unexamined patent(TOKUKAISHOU 58-93745 (1983)) discloses a method that polyamide resins are blended with modified polystyrene resins which are obtained by grafting styrene, acrylonitrile and an unsaturated carboxylic acid on a rubber. These methods are certainly able to improve the compatibility between a polyamide resin and an ABS resin and to increase the impact strength as well, but heat distortion property of them is still at an insufficient level.

Also, as a means for improving the heat distortion property, Japanese examined patent(TOKUKOUSHOU 61-60098 (1986)) and Japanese unexamined patent (TOKUKAISHOU 62-22844 (1987)) disclose a method in which a copolymerized resin containing an imide compound is added as the third component to the above-mentioned blend resins. However, these methods have such problems as a remarkable decrease of the original impact strength and flowability, though the heat distortion property is surely improved.

The present invention provides thermoplastic resin compositions giving molded articles which have superior properties in heat distortion, impact strength and surface appearance, and, which have good flowability in molding process as well, thus having solved these problems as mentioned above.

The inventors of the present invention had made a series of studies on improving the compatibility between ABS resins and polyamide resins and on increasing heat distortion temperature of the blend of these two components, and found that a thermoplastic resin composition, which is obtained by blending a polyamide resin(A), a copolymer(B) which is obtained by copolymerizing an aromatic vinyl compound a vinyl cyanide compound ,an unsaturated carboxylic acid compound and, if necessary, other vinyl compounds which can copolymerize with above mentioned monomers, a grafted copolymer(C) which contains a diene rubber of a specified average particle size and a kaolin(D), can be easily molded in its molding process, and that a molded article of this composition has a high heat distortion resistance and, also, a good balance in such properties as impact strength, chemical resistance, rigidity, surface hardness, paintability, water-proof, etc., and, further, found that this resin composition has a good flowability in its molding process and can give molded articles of a good surface appearance. Thus, the inventors of this invention have finally completed the present invention.

DISCLOSURE OF THE INVENTION

The present invention relates to a heat resistant thermoplastic resin composition comprising 5 to 95 parts by weight of a polyamide resin(A), 5 to 95 parts by weight of a copolymer(B) containing a carboxylic acid comprising 40 to 80% by weight of an aromatic vinyl compound, 15 to 50% by weight of a vinyl cyanide compound, 0.1 to 20% by weight of an unsaturated carboxylic acid compound and 0 to 30% by weight of other vinyl compounds that can copolymerize with the above compounds, 5 to 50 parts by weight of a graft copolymer(C) which is obtained by graft polymerizing 60 to 5% by weight of a vinyl compound in the presence of 40 to 95% by weight of a diene rubber of an average particle size of 0.1 to 2.0 μm, and, a kaolin(D) as such ratio as the weight part of the kaolin becomes 0.1 to 30 parts by weight to 100 parts by weight of the sum of (A), (B) and (C).

BEST MODE FOR PRACTICING THE INVENTION

As the polyamide resins(A) to be used in the present invention, for example, aliphatic polyamides such as polyamide-6, polyamide-6.6, polyamide-6.10, polyamide-11, polyamide-12, and polyamide-6.12, or aromatic polyamides such as poly-hexamethylene-amine-teraphthalic-amide and poly-hexamethylenediamine-iso-phthalic-amide or the like can be listed up, and these substances can be usable alone or in combination of two or more. Besides them, a high impact polyamide which is obtained by blending a polyamide with an acid modified polyolefin, or an elastomer of polyamide which is a block-copolymer of a polyamide and polyethylene glycol is also usable. And among these, a use of polyamide-6 or polyamide-6.6 is preferable.

The copolymer(B) containing a carboxylic acid to be used in the present invention is a copolymer comprising 40 to 80% by weight of an aromatic vinyl compound, 15 to 50% by weight of a vinyl cyanide compound, 0.1 to 20% by weight of an unsaturated carboxylic acid compound and 0 to 30% by weight of other vinyl compounds which can copolymerize with the above described compounds.

In the case that the aromatic vinyl compound is used more than 80% by weight, chemical resistance and impact strength decrease, and, in the case that it is below 40% by weight, moldability is lowered. In the case that the vinyl cyanide compound is used more than 50% by weight, heat stability is lowered in its molding process and also color stability at a high temperature is decreased. While, in the case that the vinyl cyanide compound is used less than 15% by weight, chemical resistance and impact strength are lowered.

In the case that the unsaturated carboxylic acid compound is used more than 20% by weight, heat stability in its molding process is lowered, and, also, color deterioration at a high temperature becomes remarkable.

While, in the case that it is less than 0.1% by weight, the compatibility with a polyamide is lowered, and, as a result, peeled layers appear on the surface of its molded article.

In the case that other vinyl compounds which can copolymerize with the above compounds are used more than 30% by weight, the balance between heat stability and impact strength becomes insufficient.

As the examples of the aromatic vinyl compounds which are used in the copolymer(B) containing a carboxylic acid, there are styrene, α-methylstyrene, chlorostyrene, methylstyrene or the like. Among these, α-methylstyrene is particularly preferable in the point of heat stability.

As the vinyl cyanide compounds, acrylonitrile, methacrylonitrile or the like are exemplified.

As the unsaturated carboxylic acid compounds, acrylic acid, methacrylic acid or the like are exemplified.

And further, as the examples of the other vinyl compounds which can copolymerize with above described compounds, there are alkylesters of methacrylic acid or acrylic acid such as methyl methacrylate, ethyl methacrylate, methyl acrylate, ethyl acrylate or the like, or maleimide compounds such as maleimide, phenylmaleimide or the like.

The above-mentioned aromatic vinyl compounds, vinyl cyanide compounds, unsaturated carboxylic acid compounds and other vinyl compounds can be used alone or in combination of two or more, respectively.

The copolymer containing carboxylic acid (B) can be produced, for example, by the process described below. After putting at first α-methylstyrene, water and a emulsifier into a reaction vessel and making these compounds emulsified fully, acrylonitrile and the other monomer(s) are continuously dripped little by little into the vessel in such a manner that α-methylstyrene is always excessive in an amount of not less than 80% by weight, preferably not less than 90% by weight in the polymerization vessel. Through this process, the aimed copolymer is obtained. In this case, the unsaturated carboxylic acid compound may be put into the vessel together with α-methylstyrene at the first step, or may be added as a mixture with acrylonitrile afterwards. Or, the unsaturated carboxylic acid compound can be divided into the first charged part and the second additional charged part. Further, a part of α-methylstyrene can be added in the second step described in the above. In this case, an amount of α-methylstyrene at the first charging step is in a range not less than 50 weight parts and not more than 90 parts by weight of 100 parts by weight of the total monomers to be charged.

When the copolymer(B) is produced, chemical resistance and impact strength are lowered in the case that α-methylstyrene is over 90% by weight and its high heat distortion property is decreased in the case that α-methylstyrene is less than 60% by weight. Thus, both cases are not preferable.

The graft copolymer(C) is obtained by a graft copolymerizing 60 to 5% by weight of a vinyl compound, which can graft copolymerize, in the presence of 40 to 95 weight % of a diene rubber of which average particle size is from 0.1 to 2.0 μm. In the case that the diene rubber is over 95% by weight, both impact strength and oil resistance properties are decreased, and, in the case that it is less than 40% by weight, its impact strength becomes lower.

Examples of the vinyl monomer, which can graft copolymerize and can be used in this invention, are aromatic vinyl compounds, vinyl cyanide compounds, alkyl ester compounds of unsaturated carboxylic acids, unsaturated carboxylic acid compounds and other vinyl derivatives.

The aromatic vinyl compounds, the vinyl cyanide compounds and the unsaturated carboxylic acid compounds can be the same as compounds used for the copolymer(B) containing a carboxylic acid.

As the alkyl esters of the unsaturated carboxylic acid, for example, methyl methacrylate, ethyl methacrylate, methyl acrylate, ethyl acrylate or the like are listed up.

And as the other vinyl compounds which can graft copolymerize, maleimide compounds such as maleimide, phenylmaleimide or the like are exemplified. These compounds can be used alone or in combination of two or more.

As the diene rubber which is used for the graft copolymer (C), a rubber having an average particle size of from 0.1 to 2.0 μm, preferably from 0.25 to 1.0 μm, can be used.

In a case of smaller than 0.1 μm, the thermoplastic resin composition becomes insufficient in impact strength, and in a case of over 2.0 μm, the appearance of the molded article becomes unacceptable.

The copolymer(B) containing a carboxylic acid and the graft copolymer(C) are preferably obtained by an emulsion polymerization process, but not necessarily limited thereto. For example, bulk polymerization, suspension polymerization, solution polymerization and a combination of these processes such as emulsion-suspension polymerization process or emulsion-bulk polymerization process can be exemplified.

Conventional emulsion polymerization process can be applicable for the present invention. That is, the aforementioned compounds are reacted all together in the presence of a radical initiator in an aqueous medium. Wherein, the afore-mentioned compounds may be used as a mixture or the divided parts of them may be used step by step if necessary.

And further, as an operation of putting these compounds into a reaction vessel, there is no special limit. Thus, either a method which puts all compounds at one time or a method which puts them successively can be acceptable.

As the radical initiators, water soluble or oil soluble peroxides such as potassium persulfate, ammonium persulfate, cumene hydroperoxide, paramenthane hydroperoxide or the like can be exemplified, and these radical initiators can be used alone or in combination of two or more.

Other chemical compounds, such as a polymerization accelerator, an adjusting agent of polymerization degree and an emulsifier, can be selected properly from generally known chemical compounds used in conventional emulsion polymerization processes.

The process for obtaining a dried resin from the produced latex can be also selected from conventional known processes. And, in this process, either a process that obtains the dried resin after the latex of copolymer(B) containing an unsaturated carboxylic acid and the latex of graft copolymer (C) are mixed and dried, or a process that obtains the dried resin by mixing powders of the copolymer(B) and the graft copolymer(C) which are dried separately can be applicable.

As the process of obtaining the resin from the latex, for example, there is a process for adding an acid such as hydrochloric acid, sulfuric acid, acetic acid or the like or/and adding a metal salt such as calcium chloride, magnesium chloride, aluminum sulfate to the latex to thus coagulate it, followed by dehydration and drying.

The blend resin from the copolymer(B) containing an unsaturated carboxylic acid and the graft copolymer(C) imparts a high compatibility with the polyamide resin(A) without sacrificing any of properties held by the ABS resin.

In the present invention, the especially important point is a use of a kaolin(D). The kaolin is a mineral matter consisting of an aluminum silicate. In this invention, an individual or a combination of two or more of kaolinite, nacrite, dickite, halloysite or hydrated halloysite is/are used. Among them, the kaolinite is preferable, and a baked dehydrated kaolin is especially more preferable.

Further more, the average particle size of the kaolin is preferably in a range from 0.1 to 4.0 μm, more preferably from 0.2 to 2.0 μm. In the case of less than 0.1 μm, an improving effect of rigidity of the thermoplastic resin composition therefrom is not sufficient, and, in the case of over 4.0 μm, it is not preferable, since luster and impact strength of a molded article made therefrom are lowered.

The characters of a heat resistant thermoplastic resin by the present invention are changed depending on the mixing ratio of polyamide resins(A) and copolymers(B) containing an unsaturated carboxylic acid. But in the present invention, the heat resistant thermoplastic resin composition comprises 5 to 95 parts by weight of (A), 5 to 95 parts by weight of (B) and 5 to 50 parts by weight of (C) and further 0.1 to 30 parts by weight of a kaolin(D), preferably 0.5 to 20 parts by weight to 100 parts by weight of the sum of (A), (B) and (C).

In the case where the polyamide resin(A) is less than 5 parts by weight, chemical resistance is lowered, and, in the case of over 95 parts by weight, water proofing property decreases.

In the case where the copolymer(B) containing an unsaturated carboxylic acid is less than 5 parts by weight, heat resistance decreases, and, in the case of over 95 parts by weight, chemical resistance decreases.

In the case where the graft copolymer(C) is less than 5 parts by weight, impact strength decreases, and, in the case of over 50 parts by weight, flowability in its molding process becomes worse.

In the case where the kaolin(D) is less than 0.1 part by weight, improving effects of toughness and heat distortion resistance are insufficient, and, in the case of over 30 parts by weight, a surface luster, impact strength and flowability in the molding process are remarkably lowered.

Pelletizing and molding of the heat resistant thermoplastic resin composition by the present invention can be conducted by a conventional known process. That is, after blending a polyamide (A), a copolymer(B) containing an unsaturated carboxylic acid, a graft copolymer(C) and a kaolin(D) by using a blender such as Henshel Mixer, pellets can be obtained through a melt-mixing process by using such as an extruder.

In the case where a copolymer(B) containing an unsaturated carboxylic acid and a graft copolymer(C) are a mixed powder obtained from a mixed latex, a polyamide resin(A) and a kaolin(D) are blended with the above mentioned mixed powder and pelletized.

And, pellets thus obtained can be provided to an injection molding, an extrusion molding, a blow molding, or other moldings.

Further, an individual or a combination of two or more of fillers other than the kaolin such as an anti-oxidant, a heat stabilizer, a ultra-violet absorber, an anti-static agent, a pigment, a lubricant, an anti-flammable agent or the like can be added, if needed.

Examples of the present invention are described hereinafter, but the present invention is not limited to these examples.

In the following, "part" means part by weight, and "%" means % by weight, unless otherwise noted.

EXAMPLES 1 TO 9, COMPARATIVE EXAMPLES 1 TO 6

(I) Production of the copolymers(B) containing an unsaturated carboxylic acid

Into a reaction vessel equipped with a stirrer and a reflux condenser, the following substances were poured under a nitrogen gas atmosphere.

| | |
|---|---|
| Water | 250 parts |
| Sodium formaldehyde sulfoxylate | 0.4 part |
| Ferrous sulfate | 0.0025 part |
| Disodium ethylenediamine-tetra acetate | 0.01 part |
| Dioctyl sodium sulfosuccinate | 2.0 parts |

After heated up to 60° C. with stirring, a mixture of monomers, proportions of which are given in Table 1 shown below, was continuously dripped into the vessel for 6 hours with cumene hydroperoxide as an initiator and with t-dodecylmercaptane as a polymerization degree adjuster. And, after the dripping was finished, an additional stirring for 1 hour at 60° C. was continued to thus finalize its polymerizing process. By these proceedings, the copolymer containing an unsaturated carboxylic acid(B-1) was obtained.

And also, for the comparison purpose, a copolymer(B-2) not containing the unsaturated carboxylic acid was obtained by the same manner.

TABLE 1

| | | Example B-1 | Comparative Example B-2 |
|---|---|---|---|
| Vinyl Monomers (%) | α-MeSt | 75 | 75 |
| | AN | 20 | 25 |
| | MAA | 5 | |
| CHP (part) | | 0.3 | 0.3 |
| t-DM (part) | | 0.5 | 0.5 |

α-MeSt: β-methylstyrene

TABLE 1-continued

|  | Example B-1 | Comparative Example B-2 |
|---|---|---|

AN: acrylonitrile
MAA: methacrylic acid
CHP: cumene hydroperoxide
t-DM: t-dodecylmercaptane (II) Production of the graft copolymers(C)

Into a reaction vessel equipped with a stirrer and a reflux condenser, the following substances were poured under a nitrogen gas atmosphere.

| Water | 250 parts |
|---|---|
| Potassium persulfate | 0.5 part |
| Butadiene | 100 parts |
| t-dodecylmercaptane | 0.3 part |
| Disproportionated sodiumrosinate | 3.0 parts |

Polymerizing was conducted at 60° C., and terminated at a time when the yield of polymerization of the butadiene reached 80%, and, then, the unreacted butadiene monomer was removed off. By this process, a rubbery polybutadiene latex(X) was obtained. And, an average particle size of the polybutadiene rubber thus obtained was 0.30 µm.

Next, the following substances were poured into a reaction vessel equipped with a stirrer and a reflux condenser under a nitrogen gas atmosphere.

| Water | 250 parts |
|---|---|
| Sodiumformaldehydesulfoxylate | 0.4 part |
| Ferrous sulfate | 0.0025 part |
| Disodium ethylenediamine-tetra acetate | 0.01 part |
| Polybutadiene ((X) obtained above) | Amounts described in Table 2 |

After heated up to 60° C. and stirred, a mixture of monomers, proportions of which are shown in Table 2 given below, was continuously dripped into the vessel for 5 hours with cumene hydroperoxide as an initiator and with t-dodecylmercaptane as a polymerization degree adjuster. And, after the dripping was finished, an additional stirring for 1 hour at 60° C. was continued to thus finalize its polymerizing process. By these proceedings, the graft copolymers, (C-1)~(C-3) were obtained.

TABLE 2

|  |  | Examples | | |
|---|---|---|---|---|
|  |  | C-1 | C-2 | C-3 |
| Polybutadiene (X)(%) | | 70 | 70 | 50 |
| Vinyl Monomers (%) | St | 10 | 20 | 20 |
|  | AN |  | 9 |  |
|  | MMA | 20 |  | 30 |
|  | MAA |  | 1 |  |
| CHP (part) | | 0.3 | 0.3 | 0.3 |
| t-DM (part) | | 0.2 | 0.2 | 0.2 |

St: styrene
MMA: methylmethacrylate (III) Production of compositions comprising the copolymers (B) containing an unsaturated carboxylic acid and the graft copolymers(C)

After a latex of copolymer(B) containing an unsaturated carboxylic acid and a latex of the graft copolymer(C), which had been obtained respectively by the afore-mentioned processes (I) and (II), was uniformly blended with proportions shown in Table 3 given below and a phenolic antioxidant was added to the mixture, they were coagulated by adding an aqueous magnesium chloride solution, then washed with water, dehydrated, and dried. Through these processes, the compositions (Y-1)~(Y-3) comprising the copolymer(B) containing an unsaturated carboxylic acid and the graft copolymer(C) were obtained.

And also, for the comparison purpose, the copolymer(B-2), not containing the unsaturated carboxylic acid, was blended with the graft copolymer(C) by using the same manner, and the compositions (Y-4) and (Y-5) were obtained.

TABLE 3

|  |  | Examples | | | Comparative Examples | |
|---|---|---|---|---|---|---|
|  |  | Y-1 | Y-2 | Y-3 | Y-4 | Y-5 |
| Copolymer(B) (%) | B-1 | 64 | 64 | 50 |  |  |
|  | B-2 |  |  |  | 64 | 64 |
| Copolymer(C) (%) | C-1 | 36 |  |  | 36 |  |
|  | C-2 |  | 36 |  |  | 36 |
|  | C-3 |  |  | 50 |  |  |

(IV) Production of the heat distortion resistant thermoplastic resin compositions A polyamide resin(A), a kaolin(D), a talc and the above resin compositions (Y-1)~(Y-5) which were obtained in the above (III), were mixed uniformly in proportion given in Table 4 and Table 5 shown below. And the compositions were pelletized using a vent-type twin screw extruder (Nippon Seikosho TEX-44, L/D was 38.5) under a setting temperature of 270° C.

And then, test specimens for measuring their physical properties and for evaluating the surface appearance of their molded articles were made of the obtained pellets by using an injection molding machine (Nippon Seikosho: J 150E-P) under a setting temperature of 250° C. and a die temperature at 70° C. The results are shown in Table 4 and Table 5 given below.

Measurements of their physical properties and evaluations of their surface apperance of the molded articles were conducted by below described methods.

(1) Heat Distortion Temperature (HDT)
  ASTM D-648, 18.6 Kg/cm² (°C.)
(2) Izod Impact Strength
  ASTM D-256, 23° C., with notch(kg-c m/c m)
(3) High speed surface impact test
  Test machine: Hydroshot HTM-1, made by Shimazu Seisakusho
  Diameter of a suporting frame: 50. 8 mm
  Diameter of a striker: 12.7 mm
  Punching speed : 13 m/s
  Measuring temperature: 23° C.
  Shape of a test piece: 150 mm×100 mm×3 mm
  The center of test pieces were punched out with a striker, and the total energy required was evaluated in (J).
(4) Measurement of a spiral flow
  Using pellets produced in the above (IV), the length of spiral flow was evaluated by using a die for a measurement of spiral flow [square type (3 mm thick×10 mm wide), spiral-like shape] which was attached to an injection machine (Fanac KAS-150B) under the conditions that a cylinder setting temperature was 250 ° C., a die temperature was 40° C. and a injecton pressure was 1000 kg/cm².
(5)Evaluation of the surface appearance of molded articles The surface apperance of test pieces produced in the above (IV) (existences or non-existence of an irregurality in a surface luster, a layer-like peeling. etc.) was evaluated by the eyes.

◯: An irregurality in a surface luster and a layer-like peeling was not seen.

X: An irregurality in a surface luster and a layer-like peeling was seen.

TABLE 4

| | | Example | | | | | | | | |
|---|---|---|---|---|---|---|---|---|---|---|
| | | 1 | 2 | 3 | 4 | 5 | 6 | 7 | 8 | 9 |
| (A)polyamide 6 (parts) | | 50 | 50 | 50 | 50 | 50 | 50 | 50 | 30 | 70 |
| (B) + (C) (parts) | Y-1 | 50 | 50 | 50 | 50 | 50 | | | 70 | 30 |
| | Y-2 | | | | | | 50 | | | |
| | Y-3 | | | | | | | 50 | | |
| (D)kaolin (parts) | | 1 | 2 | 5 | 10 | 15 | 5 | 5 | 10 | 10 |
| HDT(°C.) | | 105 | 106 | 110 | 116 | 118 | 108 | 107 | 120 | 107 |
| High speed surface impact (J) | | 47 | 46 | 40 | 20 | 18 | 40 | 38 | 33 | 33 |
| Izod impact strength (kg · cm/cm) | | 18 | 17 | 13 | 11 | 10 | 14 | 14 | 14 | 11 |
| Spiral flow length(mm) | | 550 | 540 | 500 | 430 | 420 | 530 | 520 | 460 | 530 |
| Surface appearance | | ◯ | ◯ | ◯ | ◯ | ◯ | ◯ | ◯ | ◯ | ◯ |

Polyamide 6: T-310 (made by TEIJIN CO. LTD..)
Kaolin(D): SATINTONE 5 (TSUCHIYA KAOLIN) (baked kaolin, average particle size = 0.8 μm)
Talc: Micro-Ace K-1(NIPPON TALC)(average particle size = 3.2 μm)

TABLE 5

| | | Comparative Examples | | | | | |
|---|---|---|---|---|---|---|---|
| | | 1 | 2 | 3 | 4 | 5 | 6 |
| (A)polyamide 6 (parts) | | 50 | 50 | 50 | 50 | 70 | 50 |
| (B) + (C)(parts) | Y-1 | 50 | 50 | | | 30 | |
| | Y-2 | | | | | | 50 |
| | Y-4 | | | 50 | | | |
| | Y-5 | | | | 50 | | |
| (D)Kaolin(parts) | | | 35 | 5 | 5 | | |
| Talc(parts) | | | | | | | 5 |
| HDT(°C.) | | 102 | 122 | 108 | 106 | 86 | 110 |
| High speed surface impact strength(J) | | 45 | 4 | 4 | 8 | 43 | 7 |
| Izod impact strength (kg · cm/cm) | | 18 | 6 | 7 | 8 | 10 | 7 |
| Spiral flow length (mm) | | 550 | 300 | 500 | 480 | 620 | 490 |
| Surface appearance | | ◯ | X | X | X | ◯ | ◯ |

Polyamide 6: T-310 (made by TEIJIN CO. LTD..)
Kaolin(D): SATINTONE 5 (TSUCHIYA KAOLIN) (baked kaolin, average particle size = 0.8 μm)
Talc: Micro-Ace K-1(NIPPON TALC)(average particle size = 3.2 μm)

INDUSTRIAL APPLICABILITY

As mentioned above, heat resistant thermo-plastic compositions by the present invention can provide molded articles which are superior in such properties as heat distortion resistance, impact strength and surface apperarance, and they are also superior in flowability in their molding process

We claim:

1. A heat resistant thermoplastic resin composition comprising (A) 5 to 95 parts by weight of a polyamide resin, (B) 5 to 95 parts by weight of a copolymer containing an unsaturated carboxylic acid, which comprises 40 to 80% by weight of an aromatic vinyl compound, 15 to 50% by weight of a vinyl cyanide compound, 0.1 to 20% by weight of an unsaturated carboxylic acid and 0 to 30% by weight of other vinyl compounds copolymerizable therewith, (C) 5 to 50 parts by weight of a graft copolymer, which is obtained by graft copolymerizing 60 to 5% by weight of a vinyl compound in the presence of 40 to 95% by weight of a diene rubber of an average particle size of 0.1 to 2.0 μm, and (D) 0.1 to 30 parts by weight of a kaolin having an average particle size of 0.1 to 4.0 μm to 100 parts by weight of the sum of (A), (B) and (C).

2. A heat resistant thermoplastic resin composition as claimed in claim 1, wherein the aromatic vinyl compound in the copolymer(B) containing an unsaturated carboxylic acid is α-methylstyrene.

3. A heat resistant thermoplastic resin composition as claimed in claim 1 or 2, wherein the kaolin(D) is 0.5 to 20 parts by weight to 100 parts by weight of the sum of the polyamide resin(A), the copolymer(B) containing an unsaturated carboxylic acid and the graft copolymer(C).

4. A heat resistant thermoplastic resin composition as claimed in claim 1 or 2, wherein an average particle size of the kaolin(D) is 0.2~2.0 μm.

5. A heat resistant thermoplastic resin composition as claimed in claim 1 or 2, wherein the kaolin(D) is a baked kaolin.

6. A heat resistant thermoplastic resin composition as claimed in claim 1 or 2, wherein an average particle size of the diene rubber in the graft copolymer(C) is 0.25~1.0 μm.

* * * * *